United States Patent
Ko et al.

(10) Patent No.: US 6,951,906 B1
(45) Date of Patent: Oct. 4, 2005

(54) PROCESS FOR HYDROGENATING A CONJUGATED DIENE POLYMER

(75) Inventors: Young Hoon Ko, Taejeon (KR); Hoo Chae Kim, Taejeon (KR); Seon Kyeong Cheong, Taejeon (KR); Jae Yun Kim, Taejeon (KR); Jin Man Hwang, Taejeon (KR); Mycong Seup So, Taejeon (KR)

(73) Assignee: Korea Kumho Petrochemical Co., Ltd., Seoul (KR)

( * ) Notice: Subject to any disclaimer, the term of this patent is extended or adjusted under 35 U.S.C. 154(b) by 0 days.

(21) Appl. No.: 09/555,161

(22) PCT Filed: Dec. 18, 1998

(86) PCT No.: PCT/KR98/00440

§ 371 (c)(1), (2), (4) Date: Jul. 24, 2000

(87) PCT Pub. No.: WO00/08069

PCT Pub. Date: Feb. 17, 2000

(30) Foreign Application Priority Data

Aug. 3, 1998 (KR) .............................. 98-31575

(51) Int. Cl.$^7$ ................................. C08F 8/04
(52) U.S. Cl. ................ 525/338; 525/332.8; 525/332.9; 525/333.1; 525/333.2; 525/339
(58) Field of Search .................. 525/338, 339

(56) References Cited

U.S. PATENT DOCUMENTS

| 5,242,986 A |   | 9/1993 | Gibler et al. ............ 525/332.8 |
| 5,814,709 A | * | 9/1998 | De Boer et al. ............ 525/338 |
| 5,886,107 A | * | 3/1999 | De Boer et al. ............ 525/338 |
| 5,925,717 A | * | 7/1999 | De Boer et al. ............ 525/338 |
| 5,994,477 A | * | 11/1999 | Ko et al. .................... 525/338 |
| 6,020,439 A | * | 2/2000 | Ko et al. .................... 525/338 |

FOREIGN PATENT DOCUMENTS

EP    0810231    12/1997

* cited by examiner

Primary Examiner—Bernard Lipman
(74) Attorney, Agent, or Firm—Davidson, Davidson & Kappel, LLC

(57) ABSTRACT

This invention relates to a process for selectively hydrogenating the unsaturated double bonds of conjugated diene units of a homopolymer or copolymer. By using a highly active novel homogeneous organo titanium catalyst represented by formula (I) and lithium hydride (LiH) prepared in solution of organo lithium compound and hydrogen as a reducing agent, a polymer could be hydrogenated with significantly high yield and good reproducibility. In addition, this invention is characterized by a novel method in that when a copolymer containing a conjugated diene and vinyl-substituted aromatic hydrocarbon, the unsaturated double bonds of conjugated diene units are selectively hydrogenated. In said formula where, Cp is a cyclopentadienyl group ($C_5H_5$); $R_1$ and $R_2$ are the same or different and are selected from halogen atom; $R_3$ and $R_4$ are the same of different and are selected from hydrogen atoms, alkyl or alkoxy group containing 1 to 12 carbon atoms, aryl or aryloxy groups containing 6 to 20 carbon atoms and cycloalkyl groups containing 6 to 20 carbon atoms.

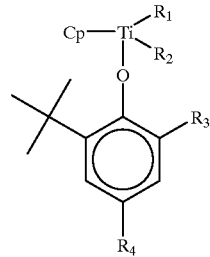

(I)

19 Claims, No Drawings

US 6,951,906 B1

PROCESS FOR HYDROGENATING A CONJUGATED DIENE POLYMER

TECHNICAL FIELD

This invention relates to a process for hydrogenating a conjugated diene polymer and more particularly, to a process for hydrogenating the unsaturated double bonds of said polymer selectively in an effort to improve some durability and oxidation resistance of a copolymer used as a modifier, wherein it comprises; to selectively hydrogenate the unsaturated double bonds of said polymer, a highly active lithium hydride(LiH) prepared in solution is contacted with a novel homogeneous organo titanium catalyst having high activity and thus, the hydrogenated block copolymer, so obtained from such selective hydrogenation, can have very high yield of hydrogenation rate with excellent hydrogenation reproducibility.

BACKGROUND ART

A polymer of conjugated diene monomer such as 1,3-butadiene or isoprene, or a copolymer with a vinyl aromatic monomer such as styrene that may be copolymerized with the conjugated diene monomer, have been widely used as an elastomer.

With the double bonds within internal polymer chain, these polymers may be vulcanized but their durability and oxidation resistances are poor.

Meantime, some block copolymers prepared from conjugated diene monomer and vinyl aromatic monomer so-called a thermoplastic elastomer have been used as a modifier to improve an impact resistance for transparent resin or polyolefin and polystyrene resin, without vulcanization.

These polymers containing olefinic unsaturated double bonds may be advantageously utilized due to their easy cross-linking reaction, while their double bonds are responsible for some stability problems such as thermal resistance, oxidation resistance and weatherability.

Under such circumstances, these polymers have been applied within the restricted range, which is an only in-house uses.

In general, in an effort to improve the durability and oxidation resistance of a polymer having unsaturated double bonds, the unsaturated double bonds may be partially or completely saturated by the addition of hydrogen in a polymer.

Various methods to hydrogenate some polymers having olefinic unsaturated double bonds have been reported but they could be classified into two main methods.

The first method is to use a heterogeneous catalyst, while the second one is to use Ziegler catalyst or a homogeneous catalyst belonging to organometallic compounds such as rhodium or titanium.

From the two methods, the hydrogenation based on a heterogeneous catalyst is performed in such a manner that a polymer of unsaturated double bonds dissolved in a suitable solvent is contacted with hydrogen in the presence of a heterogeneous catalyst. However, this method has recognized several disadvantages in that:

a) A contact between reactants and catalyst is not easily made due to the fact that the steric hindrance of a polymer is large and its relative viscosity is higher;

b) In addition due to the strong physical adsorption of a polymer to the surface of a catalyst, it is very difficult to detach the already hydrogenated polymer from the catalyst, thus it makes other unsaturated polymers hard to reach the active site of a catalyst; therefore, for the complete hydrogenation of the unsaturated double bonds of a polymer, a large amount of catalyst is required with severe reaction conditions such as a higher temperature and pressure and as a result, the decomposition and gelation of a polymer may sometimes occur;

c) In particular, the selective hydrogenation of olefinic polymer in a copolymer containing conjugated diene monomer and vinyl aromatic monomer under such severe reaction conditions is extremely difficult, since the unsaturated double bonds of an aromatic compound could be simultaneously hydrogenated;

d) In addition, the physical separation of a catalyst contained in a hydrogenated polymer solution is extremely difficult; a certain heterogeneous catalyst is strongly attached to a polymer so that its complete removal is impossible.

By contrast, the hydrogenation based on a homogeneous catalyst has the following advantages in that:

a) The activity is much higher than the one of a heterogeneous catalyst and with a small amount of catalyst, a higher yield of final product may be expected under a mild condition such as a low temperature and pressure;

b) Further, under the mild hydrogenation conditions, the selective hydrogenation of unsaturated olefinic double bonds could be performed in a copolymer chain containing vinyl aromatic monomer and conjugated diene without the hydrognation of unsaturated aromatic double bonds.

Nonetheless, the process for hydrogenating the unsaturated double bonds of a conjugated diene polymer in the presence of a homogeneous catalyst has some drawbacks in that a) the stability of a catalyst itself is low, and b) the separation of a decomposed catalyst from the hydrogenated polymer is extremely difficult.

Meantime, several methods of hydrogenating or selectively hydrogenating the unsaturated double bonds of a conjugated diene polymer has been reported; for example, the U.S. Pat. Nos. 3,494,942, 3,670,054 and 3,700,633.

These patents have described the methods of using some catalysts containing some metals belonging to the groups of 8, 9 and 10, being published in the prior art or their precursors, in an effort to hydrogenate or selectively hydrogenate the ethylenic unsaturated double bonds of a polymer and copolymer containing aromatic and ethylenic unsaturated double bonds.

According to the process of the aforementioned patent, a catalyst was prepared using some metals belonging to the groups of 9 and 10, especially nickel or cobalt compound, with a suitable reducing agent such as alkyl aluminum. Other suitable reducing agent described in the prior art include some metals belonging to the groups of 1, 2 and 13, especially lithium, magnesium and aluminum allyls or hydrides according to the prior art. Hence, some metals belonging to the groups of 1, 2 and 13 and other metals belonging to the groups of 8, 9 and 10 are mixed in the molar ratio of 0.1:1 to 20:1, more preferably in the molar ratio of 1:1 to 10:1.

The U.S. Pat. No. 4,501,857 has disclosed that the selective hydrogenation of unsaturated double bonds in a conjugated diene polymer resulting from its polymerization may be effected in the presence of at least one bis (cyclopentadienyl) titanium compound or at least one organo lithium compound.

Further, the U.S. Pat. No. 4,980,421 has disclosed that a polymer may have a similar hydrogenation activity using an alkoxy lithium compound directly or a reaction mixture between an organs lithium compound and alcohol or phenol, or its combined compound with bis(cyclopentadienyl) titanium compound. It describes that even though a small amount of catalyst is used, the catalyst is effectively active, while any washing process to remove the residual catalyst is not necessary.

The U.S. Pat. No. 4,673,714 has disclosed that bis (cyclopentadienyl) titanium compound can preferably hydrogenate unsaturated double bonds in a conjugated diene in the absence of alkyl lithium; The detailed example of such titanium compound included bis(cyclopentadienyl)titanium diaryl compound, and the most advantage of this catalyst system is that a hydrocarbon lithium compound as a reducing agent is not used.

Also, the U.S. Pat. No. 5,039,755 has disclosed a process for the hydrogenation of conjugated diene polymer which comprises polymerizing or copolymerizing one conjugated diene monomer with an organo alkali metal polymerization initiator in a suitable solvent thereby forming a living polymer, terminating the polymerization by the addition of hydrogen; The selective hydrogenation of unsaturated double bonds in the conjugated diene units of the aforementioned terminated polymer was conducted in the presence of $(C_5H_5)_2TiR_2$ (R is an arylalkyl group) catalyst.

The U.S. Pat. No. 5,243,986 has disclosed that the double bonds of conjugated diene units or a styrene-butadiene-isoprene copolymer may be selectively hydrogenated using a specific titanocene compound and reducing agent.

Further, the U.S. Pat. No. 5,321,175 has disclosed a process of hydrogenating a conjugated diene polymer in the presence of homogeneous catalysts which contain $Cp_2Ti(PhOR)_2$ (where, Cp is a cyclopentadienyl group; OR is an alkoxy compound containing 1 to 4 carbon atoms) or $Cp_2TiR_2$ (where, R is a $CH_2PPh_2$).

Also, another process of hydrogenating an olefinic monomer using a mixture of $Cp_2TiCl_2$ or $(C_6H_{10}(p-CH_3OC_6H_4)C_5H_4)_2TiCl_2$ as a catalyst and a high-activity alkali metal hydride(MH) prepared in solution has been disclosed [ref.: Journal of Organometallic Chemistry, 382 (1990) 69–76].

However, the aforementioned homogeneous catalyst has recognized some disadvantages in that a) in general, since it is extremely sensitive to an environment, the catalyst is easily inactivated in the air or in the presence of moisture, and b) the hydrogenation activity is greatly affected by the reducing state of the catalyst. Since there is trend that the reproducibility of hydrogenation is reduced in the long run, the prior art has found it difficult to obtain a hydrogenated polymer with a high hydrogenation rate and reproducibility simultaneously.

In addition, there is another trends that the active ingredients of the catalyst are easily converted to inactive ones, when the reaction proceeds. This may result in reducing the hydrogenation yield, thus being responsible for poor reaction reproducibility. Such trend will badly affect the hydrogenation of a polymer designed to improve the durability and oxidation resistance of a polymer. Furthermore, the hydrogenation rate of the homogeneous catalyst is much affected depending on its stability during the hydrogenation.

As noted in the above, it is prerequisite to overcome these drawbacks in adequately applying such homogeneous catalysts to the hydrogenation of a polymer in the industrial level. Thus, there is need to develop a highly active hydrogenation catalyst with better stability and reproducibility.

DISCLOSURE OF INVENTION

To cope with various problems encountered during the hydrogenation of unsaturated double bonds of a conjugated diene polymer using the above homogeneous catalysts, an object of this invention is to provide a process of hydrogenation using a novel catalyst and lithium hydride so as to prepare a hydrogenated polymer with a high hydrogenation yield and reproducibility without any problems the general homogeneous hydrogenation catalysts have faced.

To meet the above mentioned object, the process for hydrogenating a conjugated diene polymer according to this invention is designed to selectively hydrogenate the unsaturated double bonds of conjugated diene units of a conjugated diene polymer or a copolymer containing the conjugated diene monomer and aromatic vinyl monomer, wherein it comprises:

1) polymerizing at least one conjugated diene monomer or copolymerizing said monomer with a vinyl aromatic monomer using an organo alkali metal as an initiator thereby forming a living polymer;

2) inactivating the terminal of said living polymer using an equimolar amount of the terminating agent; and 3) hydrogenating the unsaturated double bonds in the conjugated diene units of the polymer by the addition of lithium hydride (LiH) and monocyclopentadienyl titanium compound represented by the following formula I, together with hydrogen, to the polymer having an inactivated terminal.

Formula I

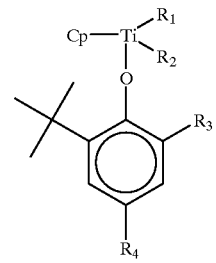

Where,

Cp is a cyclopentadienyl group($C_5H_5$);

$R_1$ and $R_2$ are the same or different and are selected from halogen atom;

$R_3$ and $R_4$ are the same or different and are selected from hydrogen atoms, alkyl or alkoxy group containing 1 to 12 carbon atoms, aryl or aryloxy groups containing 6 to 20 carbon atoms and cycloalkyl groups containing 6 to 20 carbon atoms.

BEST MODE FOR CARRYING OUT THE INVENTION

This invention is explained in more detail as set forth hereunder.

The catalyst used for the hydrogenation of this invention is prepared by mixing a monocyclopentadienyl titanium compound and lithium hydride(LiH), so formed in solution of between organo lithium compound and hydrogen.

As for the catalyst represented by the formula I, the detailed examples of monocyclopentadienyl titanium compound include the following group for a single use or in the mixed form:

monocyclopentadienyl(2-t-butyl phenoxy)titanium difluoride,
monocyclopentadienyl(2-t-butyl phenoxy)titanium dichloride,
monocyclopentadienyl(2-t-butyl phenoxy)titanium dibromide,
monocyclopentadienyl(2-t-butyl phenoxy)titanium diiodide,
monocyclopentadienyl(2,6-di-t-butyl 4methyl phenoxy) titanium difluoride,
monocyclopentadienyl(2,6-di-t-butyl 4-methyl phenoxy) titanium dichloride,
monocyclopentadienyl(2,6-di-t-butyl 4-methyl phenoxy) titanium dibromide,
monocyclopentadienyl(2,6-di-t-butyl 4-methyl phenoxy) titanium diiodide,
monocyclopentadienyl(2,6-di-t-butyl 4-methoxy phenoxy) titanium difluoride,
monocyclopentadienyl(2,6-di-t-butyl 4-methoxy phenoxy) titanium dichloride,
monocyclopentadienyl(2,6-di-t-butyl 4-methoxy phenoxy) titanium dibromide,
monocyclopentadienyl(2,6-di-t-butyl 4-methoxy phenoxy) titanium diiodide,
monocyclopentadienyl(2,6-di-t-butyl phenoxy)titanium difluoride,
monocyclopentadienyl(2,6-di-t-butyl phenoxy)titanium dichloride,
monocyclopentadienyl(2,6-di-t-butyl phenoxy)titanium dibromide,
monocyclopentadienyl(2,6-di-t-butyl phenoxy)titanium diiodide,
monocyclopentadienyl(2,4,6-tri-t-butyl phenoxy)titanium difluoride,
monocyclopentadienyl(2,4,6-tri-t-butyl phenoxy)titanium dichloride,
monocyclopentadienyl(2,4,6-tri-t-butyl phenoxy)titanium dibromide and
monocyclopentadienyl(2,4,6-tri-t-butyl phenoxy)titanium diiodide.

It is preferred that the amount of the hydrogenation catalyst is in the range of 0.01 to 20 mmol per 100 g of polymer, more preferably in the range of 0.05 to 2 mmol per 100 g of polymer.

Using the above mentioned hydrogenation catalysts, it is possible to add hydrogen to the unsaturated double bonds of conjugated diene units of a conjugated diene polymer or a copolymer with a vinyl aromatic monomer, which may be a random, tapered or block copolymer, having a molecular weight of between 500 to 1,000,000.

As have been known widely, a polymer containing ethylenic unsaturated double bonds and optional aromatic unsaturated double bonds may be prepared polymerization with one or more polyolefin, especially diolefin or via copolymerization of one or more alkenyl aromatic hydrocarbon monomers.

The copolymer may be a random, tapered, block one or its combination as well as a linear, star-shaped or radial copolymer.

The copolymer containing ethylenic unsaturated double bonds or both aromatic and ethylenic unsaturated double bond may be prepared using an organo lithium compound as an anionic initiator or Ziegler-Natta catalysts. The method of manufacturing the polymer may be applied by a common method such as bulk or solution polymerization.

Hence, the conjugated diene, which could be anionically polymerized, includes conjugated diene compounds containing 4 to 12 carbon atoms such as 1,3-butadiene, isoprene, piperylene, phenylbutadiene, 3,4-di-methyl-1,3-hexadiene and 4,5-diethyl-1,3-octadiene; it is preferred to use a conjugated diolefin containing 4 to 9 carbon atoms.

Further, copolymerizaton-available vinyl aromatic hydrocarbon with the conjugated diene compounds includes vinyl aryl compounds such as styrene, styrene substituted with various alkyl groups, styrene substituted with alkoxy groups, 2-vinyl pyridine, 4-vinyl pyridine, vinyl naphthalene and vinyl naphthalene substituted with alkyl groups.

A living polymer may be created by polymerizing or copolymering at least one conjugated diene compound or vinyl aromatic compound, which may be copolymerized with the conjugated diene compound, with an organo alkali metal initiator.

Hence, it is preferred that the aromatic vinyl monomer and conjugated diene monomer is mixed in the ratio of 1:9 to 9:1.

Further, an organo alkali metal initiator includes an organo lithium compound; the detailed example includes n-butyl lithium or sec-butyl lithium.

The next step is to inactivate the terminal of said living polymer using a terminating agent in an equimolar amount ratio; hence, the terminating agent includes amines, alcohols, esters, ketones and halogenated compounds.

The detailed examples include benzyl chloride, benzyl bromide, benzyl iodide, methyl chloride, methyl bromide, methyl iodide, ethyl chloride, ethyl bromide, ethyl iodide, butyl chloride, butyl bromide, butyl iodide, acetone, methyl isobutyl ketone, diphenyl ketone, methanol, ethanol, isopropyl alcohol, butanol, phenol, cresol, 2,6-di-t-butyl 4-methyl phenol, ethylacetate, butylacetate, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilylfluoride, triphenylsilyl chloride, triphenylsilyl bromide and triphenylsilyl iodide For performing the hydrogenation process, lithium hydride prepared in solution from the reaction of an organo lithium compound and hydrogen and a monocyclopentadienyl titanium compound represented by the formula I are added to the inactivated polymer, together with hydrogen.

Hence, it is preferred that the amount of lithium hydride is added to a monocyclopentadienyl titanium compound represented by the formula I in the molar ratio of 2 to 30; the lithium hydride is prepared in solution from the reaction of an organo lithium compound and gaseous hydrogen.

The hydrogenation using the polymer of this invention is performed in an inert solvent; the inert solvent means a solvent that is not reacted with any reactants of polymerization or hydrogenation. The suitable solvent may be selected from the following group for a single use or in the mixed form: aliphatic hydrocarbons such as n-pentane, n-hexane, n-heptane and n-octane; aliphatic cyclic hydrocarbons such as cyclohexane and cycloheptane; and ethers such as diethylether and tetrahydrofuran.

Also, aromatic hydrocarbons (e.g., benzene, toluene, xylene and ethylbenzene) may be employed if they are not hydrogenated, under a given hydrogenation conditions.

Further, the concentration of polymer is in the range of 1 to 50% by weight to a solvent; it is preferred to be in the range of 5 to 25% by weight.

Meantime, the hydrogenation of this invention is performed in such a manner that a polymer solution is maintained at a certain temperature under the atmosphere of hydrogen or inert gas; a hydrogenation catalyst represented by the formula I is added to the stirred or unstirred solution; and, a hydrogen gas is charged under a constant pressure.

The inert gas includes helium, nitrogen and argon, which represents a gaseous atmosphere in which such gas is not reacted with any reactants derived from the hydrogenation. It is rather undesirable to use air or oxygen, which serves to induce reduced activity of a catalyst due to oxidation or degradation.

In general, the hydrogenation is performed at the temperature of between 0 to 150° C. If the hydrogenation temperature is lower than 0° C. The reduced activity of catalyst and slow hydrogenation rate result in requiring a lot of catalysts, which is uneconomical. Furthermore, the insolubility of hydrogenated polymer may easily precipitate a polymer. By contrast, if the reaction temperature is higher than 150° C., there are trends that a) the activity of a catalyst is reduced, b) the gelation or the decomposition of a polymer may easily occur, and c) the selectivity for the addition of hydrogen is liable to be reduced due to easy hydrogenation of aromatic double bonds. It is preferred that the reaction temperature is maintained in the range of between 50 to 140° C.

Further, a hydrogen pressure in the hydrogenation is suitably maintained in the range of between 1 to 100 kg/cm$^2$, even if not specially limited; if the hydrogen pressure is less than 1 kg/cm$^2$, the hydrogenation rate becomes slow but in case of exceeding 100 kg/cm$^2$, a gelation will follow as a side reaction. It is more preferred to maintain the hydrogen pressure in the range of between 2 to 30 kg/cm$^2$. Since an optimum hydrogen pressure is determined in consideration of hydrogenation conditions such as a catalyst amount. In actual, it is preferred that when the amount of a hydrogenation catalyst is small, a higher hydrogen pressure is needed.

Further, the hydrogenation time of this invention is generally in the range of between several minutes to 1440 minutes. It is more preferred to maintain in the range of between 30 minutes to 360 minutes. Either batch or continuous operation may be applied for the hydrogenation of this invention.

The progress of the hydrogenation could be traced through the total amounts of hydrogen consumed.

When the hydrogenation is performed according to the processes of this invention, a hydrogenated polymer with the hydrogenation of more than 50% among the unsatated double bonds of conjugated diene units of a polymer, preferably more than 90%. Further, when a copolymer containing a conjugated diene and vinyl-substituted aromatic hydrocarbon, the hydrogenaton rate of unsaturated double bonds of conjugated diene units is more than 90%, while that of aromatic double bonds is less than 5% at the same time. Thus, a copolymer with selectively hydrogenated unsaturated double bonds of conjugated diene units only may be obtained.

As described in the above, when a conjugated diene polymer is hydrogenated using a high-activity novel catalyst, the hydrogenation may be performed under a mild condition. In particular, when a copolymer containing a conjugated diene and vinyl-substituted aromatic hydrocarbon, the unsaturated double bonds of conjugated diene units are selectively hydrogenated. According to this invention, the fact that a conjugated diene polymer is used as a base material has the following advantages in that a) a following hydrogenation is available in a same reactor, b) since a small amount of catalyst could exhibit extremely high activity, it is quite economical, and c) its industrial application may be available due to easier process.

The invention herein is explained in more detail by the following examples. These examples, cited by way of illustration, are not meant to limit the present invention in any sense.

MANUFACTURING EXAMPLE 1

Synthesis of monocyclopentadienyl(2,6-di-t-butyl 4-methyl phenoxy)titanium Chloride Catalyst Both 10 mmol (2.2 g) of monocyclopentadienyl titanium chloride(CpTiCl$_3$) and 100 ml of toluene were added to a 200 ml Schlenk reactor in the inert atmosphere. Then, 10 mmol of 2,6-di-t-butyl 4-methyl phenoxy lithium, so obtained from the reaction between 2,6-di-t-butyl 4-methyl phenol and n-butyl lithium, was slowly added to the mixture. The reactional solution was stirred at room temperature and stood for 1 hour. After 1 hour, some portions of the mixture we collected ad were analyzed by $^1$H-NMR spectroscopy to ascertain the reaction results.

Yield: 95%

$^1$H-NMR(CDCl$_3$) δ (ppm): 7.024(C$_6$H$_2$, 2H, s), 6.673 (C$_5$H$_5$, 5H, s), 2.319 (CH$_3$, 3H s), 1.417(C(CH$_3$)$_3$, 18H, s)

MANUFACTURING EXAMPLE 2

Synthesis of monocyclopentadienyl(2,6di-t-butyl 4-methoxy phenoxy)titanium chloride Catalyst Both 10 mmol (2.2 g) of monocyclopentadienyl titanium chloride(CpTiCl$_3$) and 100 ml of toluene were added to a 200 ml Schlenk reactor in the atmosphere of inert gas. Then, 10 mmol of 2,6-di-t-butyl 4-methoxy phenoxy lithium, so obtained from the reaction between 2,6-di-t-butyl 4-methoxy phenol and n-butyl lithium, was slowly added to the mixture. The reactional solution was stirred at room temperature and stood for 1 hour. After 1 hour, some mixture was collected and was analyzed by $^1$H-NMR spectroscopy to ascertain the reaction results.

Yield: 95% $^1$H-NMR(CDCl$_3$) δ (ppm): 6.776(C$_6$H$_2$, 2H, s), 6.670(C$_5$H$_5$, 5H, s), 3.824 (OCH$_3$, 3H, s), 1.428(C(CH$_3$)$_3$, 18H, s)

MANUFACTURING EXAMPLE 3

Synthesis of monocyclopentadienyl(2,4,6-tri-t-butyl phenoxy)titanium chloride Catalyst Both 10 mmol (2.2 g) of monocyclopentadienyl titanium chloride(CpTiCl$_3$) and 100 ml of toluene were added to a 200 ml Schlenk reactor in the atmosphere of inert gas. Then, 10 mmol of 2,4,6-tri-t-butyl phenoxy lithium, so obtained from the reaction between 2,4,6-tri-t-butyl phenol and n-butyl lithium, was slowly added to the mixture. The reactional solution was stirred at room temperature and stood for 1 hour. After 1 hour, some mixture was collected and was analyzed by $^1$H-NMR spectroscopy to ascertain the reaction results.

Yield: 96%

$^1$H-NMR(CDCl$_3$) δ (ppm): 7.226(C$_6$H$_2$, 2H, s), 6.679 (C$_5$H$_5$, 5H, s), 1.431 (C(CH$_3$)$_3$18H,s), 1.322(C(CH$_3$)$_3$, 9H, s)

MANUFACTURING EXAMPLE 4

Synthesis of monocyclopentadienyl(2,6-di-t-butyl phenoxy)titanium chloride Catalyst Both 10 mmol (2.2 g) of monocyclopentadienyl titanium chloride(CpTiCl$_3$) and 100 ml of toluene were added to a 200 ml Schlenk reactor in the atmosphere of inert gas. Then, 10 mmol of 2,6-di-t-butyl phenoxy lithium, so obtained from the reaction between 2,6-di-t-butyl phenol and n-butyl lithium, was slowly added to the mixture. The reactional solution was stirred at room temperature and stood for 1 hour. After 1 hour, some mixture was collected and was analyzed by $^1$H-NMR spectroscopy to ascertain the reaction results.

Yield: 95%

$^1$H-NMR(CDCl$_3$) δ (ppm): 7.269(m-C$_6$H$_2$, 2H, d), 6.930 (p-C$_6$H$_1$, 1H, t) 6.67 (C$_5$H$_5$, 5H, s), 1.430(C(CH$_3$)$_3$, 18H, s)

MANUFACTURING EXAMPLE 5

Synthesis of lithium hydride(LiH)

3.5 L of alkyl lithium solution (0.2M cyclohexane solution) was added to a 5 L autoclave reactor in the atmosphere of inert gas, followed by the addition of 500 g of tetrahydrofuran. The reactor was placed at room temperature, stirred at 500 rpm using a stirrer and with the addition of gaseous hydrogen, stood for 1 hour, while maintaining the pressure of 10 kg/cm$^2$. After 1 hour, the solution was turned to a milk-like suspension. Hence, the reaction was completed, when some proportions of the solution were reacted with a styrene monomer and it was confirmed that there was no change in the color of the mixture by a macroscopical observation. Thus, it was verified that alkyl lithium did no longer exist in the solution

MANUFACTURING EXAMPLE 6

Synthesis of styrene-butadiene-styrene Block Copolymer Treated with benzylchloride 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymerization. Finally, 124 g of styrene monomer was added to the mixture and polymerized for 30 minutes. With the addition of 2.0 g of benzylchloride, the terminal of a polymer was inactivated.

The polymer, so obtained, was a styrene-butadiene-styrene block copolymer with the following characteristics: Bound styrene content: 31.0%(block styrene content: 30.0%), a bound 1,2 vinyl content of butadiene units: 38.5%(26.6% based on the total of polymer), and number-average molecular weight: about 50,000.

MANUFACTURING EXAMPLE 7

Synthesis of styrene-butadiene-styrene Block Copolymer Treated with t-butyl chloride 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymeriztion. Finally, 124 g of styrene monomer was added to the mixture and polymerized for 30 minutes. With the addition of 1.5 g of t-butyl chloride, the terminal of a polymer was inactivated.

The polymer, so obtained, was a styrene-butadiene-styrene block copolymer with the following characteristics: Bound styrene content: 31.0%(block styrene content: 30.0%), a bound 1,2 vinyl content of butadiene units: 38.5%(26.6% based on the total of polymer), and number-average molecular weight: about 50,000.

MANUFACTURING EXAMPLE 8

Synthesis of styrene-butadiene-styrene Block Copolymer Treated with isopropyl alcohol 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymerization. Finally, 124 g of styrene monomer was added to the mixture and polymerized for 30 minutes. With the addition of 1.0 g of isopropyl alcohol, the terminal of a polymer was inactivated.

The polymer, so obtained, was a styrene-butadiene-styrene block copolymer with the following characteristics: Bound styrene content: 31.0%(block styrene content: 30.0%), a bound1,2-vinyl content of butadiene units: 38.5% (26.6% based on the total of polymer), and number-average molecular weight: about 50,000.

MANUFACTURING EXAMPLE 9

Synthesis of styrene-butadiene-styrene Block Copolymer Treated with Acetone 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and the 552 g of 1,3-butadiene monomer were further added to a reactor for 1-hour polymerization. Finally, 124 g of styrene monomer was added to the mixture and polymerized for 30 minutes. With the addition of 0.9 g of acetone, the terminal of a polymer was inactivated.

The polymer, so obtained, was a styrene-butaciene-styrene block copolymer with the following characteristics: Bound styrene content: 31.0%(block styrene content: 30.0%), a bound 1,2-vinyl content of butadiene units: 38.5% (26.6% based on the total of polymer), and number-average molecular weight: about 50,000.

MANUFACTURING EXAMPLE 10

Synthesis of styrene-butadiene-styrene Block Copolymer Treated with allyl chloride 4,800 g of cyclohexane was added to a 10 L autoclave reactor, and followed by the addition of 1 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymerization. Finally, 124 g of styrene monomer were added to the mixture and polymerized for 30 minutes. With the addition of 1.2 g of allyl chloride, the terminal of a polymer was inactivated.

The polymer, so obtained, was a styrene-butadiene-styrene block copolymer with the following characteristics: Bound styrene content: 31.0%(block styrene content: 30.0%), a bound 1,2-vinyl content of butadiene units: 38.5% (26.6% based on the total of polymer), and number-average molecular weight: about 50,000.

MANUFACTURING EXAMPLE 11

Synthesis of styrene-butadiene-styrene Block Copolymer Treated with Trimethylsilyl Chloride 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymerization. Finally, 124 g of styrene monomer was added to the mixture and polymerized for 30 minutes. With the addition of 1.2 g of benzyl chloride, the terminal of a polymer was inactivated.

The polymer, so obtained, was a styrene-butadiene-styrene block copolymer with the following characteristics: Bound styrene content: 31.0%(block styrene content: 30.0%), a bound 1,2-vinyl content of butadiene units: 38.5% (26.6% based on the total of polymer), and number-average molecular weight: about 50,000.

MANUFACTURING EXAMPLE 12

Synthesis of styrene-butadiene-styrene Block Copolymer Treated with methyl bromide 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of 1,3-butadiene monomer was further added to a reactor for 1-hour polymerization. Finally, 124 g of styrene monomer was added to the mixture and polymerized for 30 minutes. With the addition of 1.5 g of methyl bromide, the terminal of a polymer was inactivated.

The polymer, so obtained, was a styrene-butadiene-styrene block copolymer with the following characteristics: Bound styrene content: 31.0%(block styrene content: 30%), a bound 1,2-vinyl content of butadiene units: 38.5%(26.6% based on the total of polymer), and number-average molecular weight: about 50,000.

MANUFACTURING EXAMPLE 13

Synthesis of styrene-isoprene-styrene Block Copolymer Treated with t-butyl chloride 4,800 g of cyclohexane was added to a 10 L autoclave reactor, and followed by the addition of 11 g of tetrahydrofuran, 124 g of styrene monomer and 16 mmol of n-butyl lithium. The mixture was polymerized for 30 minutes and then 552 g of isoprene monomer was further added to a reactor for 1-hour polymerization. Finally, 124 g of styrene monomer was added to the mixture and polymerized for 30 minutes. With the addition of 1.9 g of benzyl chloride, the terminal of a polymer was inactivated.

The polymer, so obtained, was a styrene-butadiene-styrene block copolymer with the following characteristics: Bound styrene content: 31.0%(block styrene content: 30.0%), a bound 1,2-vinyl content of butadiene units: 38.5% (26.6% based on the total of polymer), and number-average molecular weight: about 50,000.

MANUFACTURING EXAMPLE 14

Synthesis of styrene-butadiene Random Copolymer Treated with t-butyl chloride 5,000 g of cyclohexane was added to a 10 L autoclave reactor, and followed by the addition of 100 g of tetrahydrofuran, 130 g of styrele monomer ad 870 g of butadiene monomer. With the addition of 10 mmol of n-butyl lithium the mixture was polymerized for 1 hour and then 0.9 g of t-butyl chloride was further added to a reactor to deactivate the terminal of a polymer.

The polymer, so obtained, was a styrene-butadiene random copolymer with the following characteristics: Bound styrene content: 13%, a bound 1,2-vinyl content of butadiene units: 57%, and number-average molecular weight: about 100,000.

MANUFACTURING EXAMPLE 15

Synthesis of Butadiene Polymer Treated with t-butyl chloride 5,000 g of cyclohexane was added to a 10 L autoclave reactor, and followed by the addition of 1,000 g of butadiene monomer. With the addition of 10 mmol of n-butyl lithium, the mixture was polymerized for 2 hours and then 0.9 g of t-butyl chloride was further added to a reactor to deactivate the terminal of a polymer.

The polymer, so obtained, was a butadiene polymer with the following characteristics: a bound 1,2 vinyl content of butadiene units: 57%, bound cis content: 35% and number-average molecular weight: about 100,000.

MANUFACTURING EXAMPLE 16

Synthesis of Isoprene Polymer Treated with t-butyl chloride 5,000 g of cyclohexane was added to a 10 L autoclave reactor, and followed by the addition of 1,000 g of isoprene monomer. With the addition of 10 mmol of n-butyl lithium, the mixture was polymerized for 2 hours and then 0.9 g of t-butyl chloride was further added to a reactor to deactivate the terminal of a polymer.

The polymer, so obtained, was a isoprene polymer with the following characteristics: a bound 1,2-vinyl content of butadiene units: 10% and number-average molecular weight about 100,000.

EXAMPLE 1~7

2,800 g of a polymer solution containing 400 g of a polymer, so obtained from Manufacturing Examples 6~12, was put in a 5 L autoclave reactor, stirred at 400 rpm and heated at 60° C.

Then, 32 mmol of LiH and 1.6 mmol of a catalyst, so obtained from Manufacturing Examples 5 and 1, respectively, were added to the polymer solution. The reactor was pressurized with hydrogen at 10 kgf/cm$^2$ to continue the hydrogenation for 180 minutes. After the reaction was completed, the reactor was cooled with the pressure lowered to atmospheric pressure. The reaction mixture was added to methanol to precipitate the polymer.

The $^1$H-NMR results on the hydrogenated polymer such as the hydrogenation yield of butadiene units and styrene units were shown in the following table 1.

TABLE 1

|  | Example | | | | | | |
| --- | --- | --- | --- | --- | --- | --- | --- |
|  | 1 | 2 | 3 | 4 | 5 | 6 | 7 |
| Manufacturing example (polymer) | 6 | 7 | 8 | 9 | 10 | 11 | 12 |
| Hydrogenation yield of butadiene units (%) | 99 | 99 | 98 | 97 | 99 | 99 | 98 |
| Hydrogenation yield of styrene units (%) | <1 | <1 | <1 | <1 | <1 | <1 | <1 |

EXAMPLE 8~13

The hydrogenation was performed in the same manner as Example 1 except for using the polymers and catalysts, so obtained from Manufacturing Examples 6~12 and Manufacturing Examples 2~4, respectively. The results were shown in the following table 2.

TABLE 2

|  | Example |  |  |  |  |  |
|---|---|---|---|---|---|---|
|  | 8 | 9 | 10 | 11 | 12 | 13 |
| Manufacturing example (catalyst) | 2 | 2 | 3 | 3 | 4 | 4 |
| Manufacturing example (polymer) | 6 | 7 | 8 | 10 | 11 | 12 |
| Hydrogenation yield of butadiene units (%) | 99 | 98 | 99 | 99 | 99 | 99 |
| Hydrogenation yield of styrene units (%) | <1 | <1 | <1 | <1 | <1 | <1 |

EXAMPLE 14~17

The hydrogenation was performed in the same manner as Example 1 except for using the polymers and catalysts, so obtained from Manufacturing Examples 13~16 and Manufacturing Example 2, respectively. The results were shown in the following table 3.

TABLE 3

|  | Example |  |  |  |
|---|---|---|---|---|
|  | 14 | 15 | 16 | 17 |
| Manufacturing example (catalyst) | 2 | 2 | 2 | 2 |
| Manufacturing example (polymer) | 13 | 14 | 15 | 16 |
| Hydrogenation yield of butadiene units (%) | 97 | 98 | 95 | 95 |
| Hydrogenation yield of styrene units (%) | <1 | <1 | — | — |

EXAMPLE 18~22

2,800 g of a polymer solution containing 400 g of a polymer, so obtained from Manufacturing Examples 11, was put in a 5 L autoclave reactor, stirred at 400 rpm and heated at 60° C. Then, the amount of LiH and a catalyst so obtained from Manufacturing Examples 5 and 1, respectively, was adjusted and added to the polymer solution. The reactor was pressurized with hydrogen at 10~20 kgf/cm² to continue the hydrogenation for 180 minutes. After the reaction was completed, the reactor was cooled with the pressure lowered to atmospheric pressure. The reaction mixture was added to methanol to precipitate the polymer.

The $^1$H-NMR results on the hydrogenated polymer such as the hydrogenation yields of butadiene units and styrene units were shown in the following table 4.

TABLE 4

|  | Example |  |  |  |  |
|---|---|---|---|---|---|
|  | 18 | 19 | 20 | 21 | 22 |
| Manufacturing example (polymer) | 11 | 11 | 11 | 11 | 11 |
| Pressure of hydrogen (kgf/cm²) | 20 | 15 | 15 | 10 | 10 |
| Amount of catalyst (mM/polymer of 100 g) | 0.1 | 0.15 | 0.2 | 0.3 | 0.8 |
| Molar ratio of LiH and catalyst | 15 | 15 | 10 | 10 | 6 |
| Hydrogenation yield of butadiene units (%) | 92 | 97 | 99 | 99 | 99 |
| Hydrogenation yield of styrene units (%) | <1 | <1 | <1 | <1 | <1 |

As mentioned above in more detail, a novel catalyst of this invention prepared from a mixture of monocyclopentadienyl titanium compound and lithium hydride formed in solution of organo lithium and hydrogen has recognized some advantages in that a) when a conjugated diene polymer is hydrogenated using a highly active novel catalyst, the hydrogenation may be performed under a mild condition, and b) in particular, when a copolymer containing a conjugated diene and vinyl-substituted aromatic hydrocarbon, the unsaturated double bonds of conjugated diene units are selectively hydrogenated.

INDUSTRIAL APPLICATION

According to this invention, the fact that a conjugated diene polymer is used as a base material has the following advantages in that a) a following hydrogenation is available in a same reactor, b) since a small amount of catalyst could exhibit extremely high activity, it is quite economical, and c) its industrial application may be available due to easier process.

What is claimed is:

1. Process for hydrogenating a conjugated diene polymer, wherein it comprises:

polymerizing at least one conjugated diene monomer or copolymerizing said monomer with a vinyl aromatic monomer using an organo alkali metal as an initiator thereby forming a living polymer;

deactivating the terminal of said living polymer using a terminating agent in an equimolar amount; and hydrogenating the unsaturated double bonds in the conjugated diene units of the polymer by the addition of lithium hydride (LiH) and monocyclopentadienyl titanium compound represented by the following formula I, together with hydrogen, to the polymer having an inactivated terminal;

Formula I

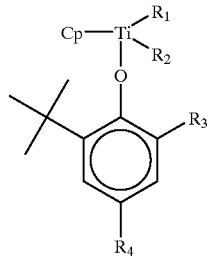

Where,

Cp is a cyclopentadienyl group($C_5H_5$);

$R_1$ and $R_2$ are the same or different and are selected from halogen atom;

$R_3$ and $R_4$ are the same or different and are selected from hydrogen atoms, alkyl or alkoxy group containinig 1 to 12 carbon atoms, aryl or aryloxy groups containing 6 to 20 carbon atoms and cycloalkyl groups containing 6 to 20 carbon atoms.

2. The process of claim 1, wherein said conjugated diene monomer includes isoprene or butadiene.

3. The process of claim 1, wherein said vinyl aromatic monomer includes styrene or alphamethyl styrene.

4. The process of claim 1, wherein said conjugated diene monomer and vinyl aromatic monomer are mixed in the weight ratio of 1:9 to 9:1.

5. The process of claim 1, wherein said organo alkali metal initiator includes an organo lithium compound.

6. The process of claim 5, wherein said organo lithium compound includes n-butyl lithium or sec-butyl lithium.

7. The process of claim 1, wherein said terminating agent is employed from one or more compounds selected from the group consisting of amines, alcohols, esters, ketones and halogenated compounds.

8. The process of claim 1, wherein said terminating agent is selected from the following group: benzyl chloride, benzyl bromide, benzyl iodide, methyl chloride, methyl bromide, methyl iodide, ethyl chloride, ethyl bromide, ethyl iodide, butyl chloride, butyl bromide, butyl iodide, acetone, methyl isobutyl ketone, diphenyl ketone, methanol, ethanol, isopropyl alcohol, butanol, phenol, cresol, 2,6-di-t-butyl 4-methyl phenol, ethylacetate, butylacetate, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilyl fluoride, triphenylsilyl chloride, triphenylsilyl bromide and triphenylsilyl iodide.

9. The process of claim 1, wherein said lithium hydride compound comparing to monocyclopentadienyl titanium compound is excessively used in the molar ratio of 2 to 30.

10. The process of claim 1, where said lithium hydride is prepared in solution of an organo lithium compound and hydrogen gas.

11. The process of claim 1, wherein said monocyclopentadienyl titanium compound is selected from the following group for a single use or in the mixed form:
monocyclopentadienyl(2-t-butyl phenoxy)titanium difluoride,
monocyclopentadienyl(2-t-butyl phenoxy)titanium dichloride,
monocyclopentadienyl(2-t-butyl phenoxy)titanium dibromide,
monocyclopentadienyl(2-t-butyl phenoxy)titanium diiodide,
monocyclopentadienyl(2,6-di-t-butyl 4-methyl phenoxy) titanium difluoride,
monocyclopentadienyl(2,6-di-t-butyl 4-methyl phenoxy) titanium dichloride,
monocyclopentadienyl(2,6-di-t-butyl 4-methyl phenoxy) titanium dibromide,
monocyclopentadienyl(2,6-di-t-butyl 4-methyl phenoxy) titanium diiodide,
monocyclopentadienyl(2,6-di-t-butyl 4-methoxy phenoxy) titanium difluoride,
monocyclopentadienyl(2,6-di-t-butyl 4-methoxy phenoxy) titanium dichloride,
monocyclopentadienyl(2,6-di-t-butyl 4-methoxy phenoxy) titanium dibromide,
monocyclopentadienyl(2,6-di-t-butyl 4-methoxy phenoxy) titanium diiodide,
monocyclopentadienyl(2,6-di-t-butyl phenoxy)titanium difluoride,
monocyclopentadienyl(2,6-di-t-butyl phenoxy)titanium dichloride,
monocyclopentadienyl(2,6-di-t-butyl phenoxy)titanium dibromide,
monocyclopentadienyl(2,6-di-t-butyl phenoxy)titanium diiodide,
monocyclopentadienyl(2,4,6-tri-t-butyl phenoxy)titanium difluoride,
monocyclopentadienyl(2,4,6-tri-t-butyl phenoxy)titanium dichloride,
monocyclopentadienyl(2,4,6-tri-t-butyl phenoxy)titanium dibromide and
monocyclopentadienyl(2,4,6-tri-t-butyl phenoxy)titanium diiodide.

12. The process of claim 1, wherein said hydrogenation is performed under the following reaction conditions: temperature from 0 to 150° C., pressure from 1 to 100 kgf/cm$^2$, amount of catalyst from 0.01 to 20 mM/100 g polymer and time from 15 to 1440 minutes.

13. The process of claim 1, wherein said hydrogenation is performed under the following reaction conditions: temperature(50 to 140° C.), pressure(5 to 20 kgf/cm$^2$), amount of catalyst(0.05 to 2 mM/100 g polymer) and time(30 to 360 minutes).

14. The process of claim 1, wherein said polymer has a number-average molecular weight of between 500 to 1,000,000.

15. The process of claim 1, wherein said hydrogenation is performed in such a manner that the unsaturated double bonds are hydrogenated having more than 95% conjugated diene units and less than 5% vinyl aromatic units.

16. The process of claim 1, wherein the concentration of said polymer is in the range of 1 to 50 wt % in a solvent.

17. The process of claim 7, wherein said terminating agent is selected from the following group: benzyl chloride, benzyl bromide, benzyl iodide, methyl chloride, methyl bromide, methyl iodide, ethyl chloride, ethyl bromide, ethyl iodide, butyl chloride, butyl bromide, butyl iodide, acetone, methyl isobutyl ketone, diphenyl ketone, methanol, ethanol, isopropyl alcohol, butanol, phenol, cresol, 2,6-di-t-butyl 4 methyl phenol, ethylacetate, butylacetate, trimethylsilyl fluoride, trimethylsilyl chloride, trimethylsilyl bromide, trimethylsilyl iodide, triethylsilyl fluoride, triethylsilyl chloride, triethylsilyl bromide, triethylsilyl iodide, tributylsilyl fluoride, tributylsilyl chloride, tributylsilyl bromide, tributylsilyl iodide, triphenylsilyl fluoride, triphenylsilyl chloride, triphenylsilyl bromide and triphenylsilyl iodide.

18. The process of claim 9, where said lithium hydride is prepared in solution of an organo lithium compound and hydrogen gas.

19. The process of claim 12, wherein said hydrogenation is performed under the following reaction conditions: temperature(50 to 140° C.), pressure(5 to 20 kgf/cm$^2$), amount of catalyst(0.05 to 2 mM/100 g polymer) and time(30 to 360 minutes).

* * * * *